United States Patent [19]

Usui et al.

[11] Patent Number: 4,627,624
[45] Date of Patent: Dec. 9, 1986

[54] PACKING HAVING MULTIPLE SEAL PORTIONS

[75] Inventors: Seiji Usui; Kunio Terada, both of Kyoto, Japan

[73] Assignee: Horiba, Ltd., Kyoto, Japan

[21] Appl. No.: 797,033

[22] Filed: Nov. 12, 1985

[30] Foreign Application Priority Data

Dec. 19, 1984 [JP] Japan ............................ 59-193552[U]

[51] Int. Cl.$^4$ .......................... F16J 15/06; F16K 11/02
[52] U.S. Cl. ...................................... 277/12; 277/215; 137/625.46; 251/314
[58] Field of Search ...................... 137/625.46, 625.31, 137/625.41, 625.47; 277/12, 32, 215; 251/314

[56] References Cited

U.S. PATENT DOCUMENTS

| | | | |
|---|---|---|---|
| 2,908,293 | 10/1959 | Johnson | 137/625.46 |
| 3,385,321 | 5/1968 | Ehrens et al. | 137/625.46 |
| 3,488,032 | 1/1970 | Scott | 137/625.46 X |
| 3,961,749 | 6/1976 | Orcutt | 137/625.46 X |
| 4,156,437 | 5/1979 | Chivens et al. | 137/625.46 X |
| 4,448,214 | 5/1984 | D'Alessio | 137/625.46 |
| 4,501,408 | 2/1985 | Pawelzik et al. | 137/625.46 X |

FOREIGN PATENT DOCUMENTS

| | | | |
|---|---|---|---|
| 146517 | 5/1952 | Australia | 137/625.46 |
| 1159846 | 2/1958 | France | 137/625.46 |
| 56-143808 | 11/1981 | Japan | 137/625.46 |

Primary Examiner—Robert S. Ward
Attorney, Agent, or Firm—Wenderoth, Lind & Ponack

[57] ABSTRACT

A packing which includes a plurality of seal portions integrally formed on an annular elastic sheet. The seal portions are spaced about the circumference of the sheet and project from one side surface of the sheet. Each seal portion has a through hole extending entirely through the sheet parallel to the center axis of the sheet. In the preferred embodiment, the packing is used in a rotary change-over valve and each seal portion has an annular rib at its free end which is adapted to fit in a corresponding hole in a rotary valve inlet element with the packing held in a recess in the inlet element between the inlet element and a rotary valve outlet element.

2 Claims, 10 Drawing Figures

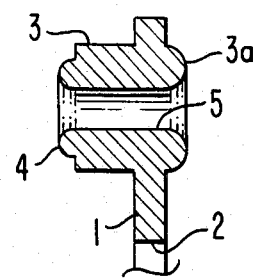
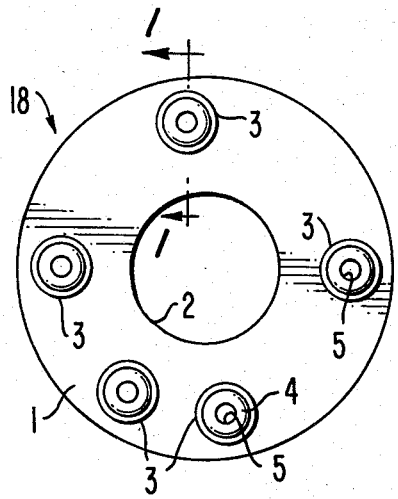
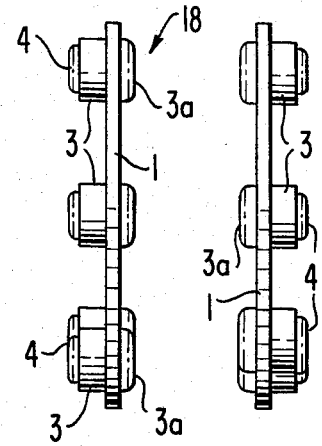
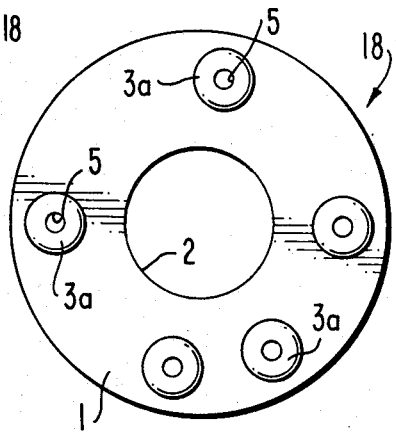
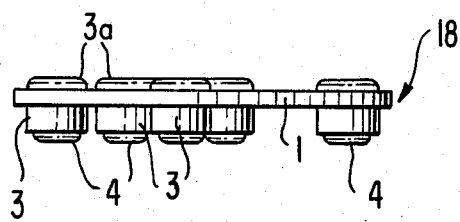
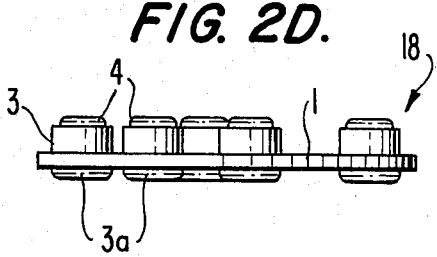
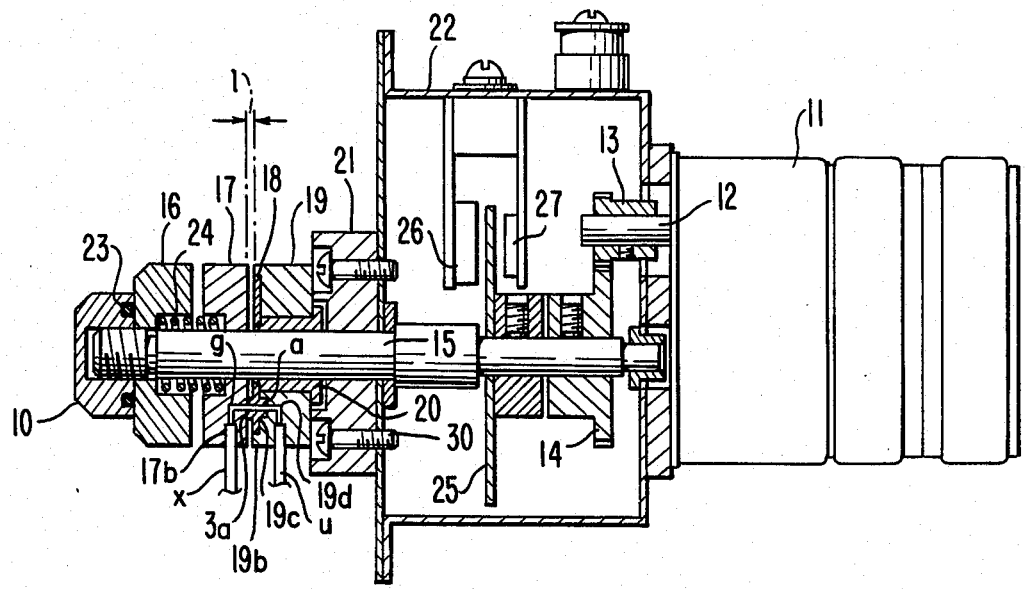

1

PACKING HAVING MULTIPLE SEAL PORTIONS

BACKGROUND OF THE INVENTION

1. Field of the Invention

The present invention relates to a packing for sealing up a plurality of portions of an apparatus to be sealed, and in particular, to a packing used in, for example, a rotary change-over valve or the like of a liquid analyzer.

2. Description of the Prior Art

A particular flow-through type liquid analyzer, which is one example of a device to which a packing according to the present invention may be applied, is adapted so that the liquid flowing through a passage with bubbles interspersed between doses of liquid may be introduced into a detecting portion of the analyzer prior to the analysis, as disclosed in U.S. patent application Ser. No. 609,551, filed May 7, 1984, now abandoned. In order to introduce bubbles into the liquid flowing through the passage, a pump for pumping the liquid into the detecting portion, and a rotary type change-over valve are used. At least one of a plurality of inlet ports of this rotary type change-over valve is connected with a corresponding liquid-introducing tube, and the remaining inlet ports are connected to a source of air or an inert gas so that the starting end of a liquid passage to the detecting portion may be connected with an outlet port of the valve selectively connectable with these inlets ports. With this arrangement, the liquid doses and bubbles are alternately introduced into the liquid passage by the action of the pump and the selective connection of the outlet port of the change-over valve with an inlet port thereof.

In order to seal a space between an inlet port and the outlet port when the inlet port and outlet port are aligned, of such an analyzer apparatus, it has been attempted, for example, to use a separate O-ring for each of a large number of inlet ports and to subject ceramics and the like to mirror polishing.

Since use of the above described type change-over valve requires frequent selective changes in the connection of the outlet port with the inlet ports, not only a very good seal, but also easy maintenance to assure a continued good seal is required.

However, in the conventional means using O-rings a large number of O-rings is required and they are independent, respectively, so that it is difficult and has not been achieved to provide every O-ring with sufficient holding pressure to assure a sufficient seal. In addition, a rough surface is apt to be produced on the internal surface of the passage in the sealing portion. In particular, liquids tending to solidify in the passage such as blood, are apt to clog the passage and as a result, much difficulty and expense is encountered because the O-rings must be replaced and installed with great accuracy at the facings thereof.

SUMMARY OF THE INVENTION

It is an object of the present invention to obtain a packing which provides an improved seal and reduced maintenance requirements.

In order to solve the above described technical problem, the present invention adopts the novel technical means that all O-rings, spaced from each other, are integrally formed as sealing portions of an annular sheet.

Both the sheet and the sealing portions are integrally made of elastic materials such as silicon rubber and fluorine rubber.

Accordingly, O-rings need not be replaced one-by-one as in the conventional manner, regardless of the number thereof, but all of a large number of O-rings can easily be replaced at once. In addition, the rubbery elasticity required for packings is increased by the existence of the sheet, and sufficient holding pressure for each of the sealing portions is assured by using a wide sheet which is easy to subject to a high holding pressure.

BRIEF DESCRIPTION OF THE DRAWINGS

These and other aspects of the invention will be better understood from the following detailed description of the preferred embodiment, with reference to the accompanying drawings in which:

FIG. 1 is an enlarged cross-sectional view of the principal parts of a packing according to the present invention, taken along the line A—A in FIG. 2A;

FIGS. 2A–2F are views of a packing according to the present invention, in which FIG. 2A is a front view, FIG. 2B is a rear view, FIG. 2C is a plan view, FIG. 2D is a bottom view, FIG. 2E is a right side view and FIG. 2F is a left side view;

FIG. 3 is a view partially in cross section of a rotary type change-over valve using a packing according to the present invention.

DETAILED DESCRIPTION OF THE PREFERRED EMBODIMENT

Figure 4A:
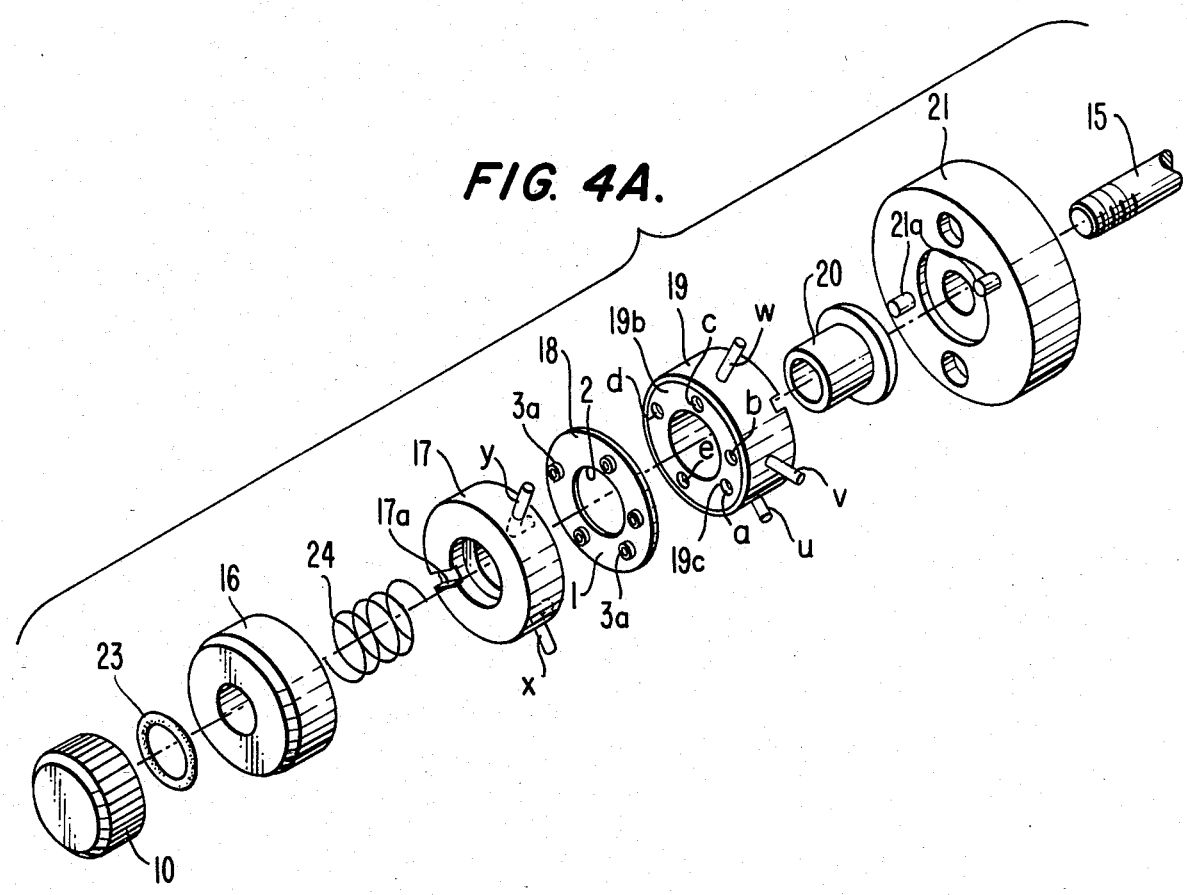
FIG. 4A and FIG. 4B are exploded perspective views showing the principal parts of the valve shown in FIG. 3.

The preferred embodiment of the present invention will be described below with reference to the drawings. Referring to FIG. 1, which is a cross-sectional view of the principal parts, and FIGS. 2A–2F, which are respectively front, rear, plan, bottom, right side and left side views of a packing 18, reference numeral 1 designates a flat annular sheet of silicon rubber provided with a hole 2 into which a shaft of a change-over valve which will be described below is inserted at the center thereof. Five seal portions 3 are integrally provided so as to protrude from the right side or the the reverse side of the sheet outwardly in the direction of the axis of the hole 2 at suitable intervals at the circumference of a circle having a certain definite radius and the axis of the hole 2 as its center. Each seal portion 3 is provided with an annular rib 4 having a slightly smaller diameter and integrally formed at the end surface of the projecting end thereof. The seal portions also have portions 3a which protrude slightly from the other side of the sheet 1. A gas-liquid hole 5 extends axially through the center of each seal portion 3 from one side of sheet 1 to the other. Although five seal portions are provided in this embodiment, the number can be suitably selected as the use requires.

Next, the use of the preferred embodiment in a rotary type change-over valve will be described.

Figure 4B:
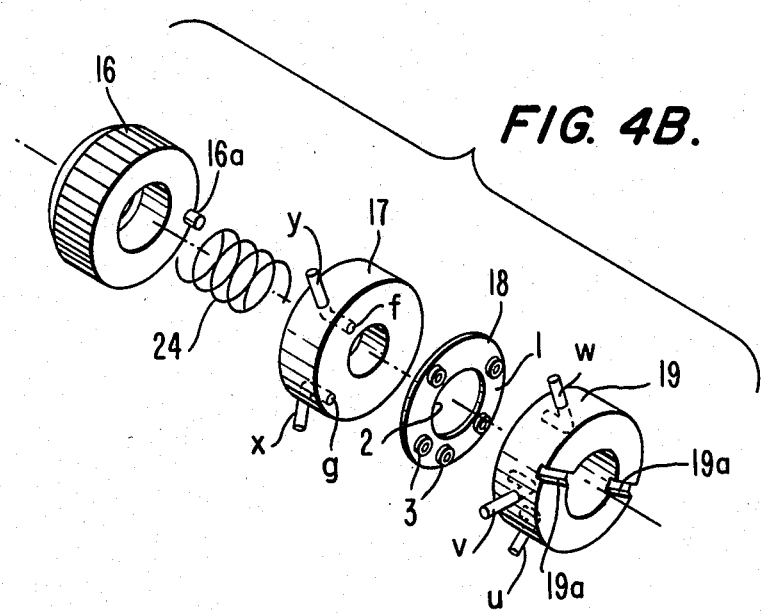

Referring to FIG. 3, which is a partially cross-sectional view showing a rotary type change-over valve, and FIGS. 4A and 4B which are exploded perspective views showing the principal parts of the rotary type change-over valve, a thumb nut 10 is screwed into the pointed end of a shaft 15 interlocked with a power shaft 12 of a motor 11 through gears 13 and 14. A driver 16, a valve outlet element 17 serving as a seal driver, a packing 18, a valve inlet element 19 serving as a seal holder, a bearing 20 and a die 21 are mounted on shaft 15 in the stated order toward the motor 11. The driver 16, valve outlet element 17, the packing 18, the valve inlet element 19, the bearing 20 and the die 21 are not rotatable with the shaft 15. The die 21 is fixedly connected with a casing 22 provided with a sensor portion and a gear drive therein by means of screw 30.

The driver 16 is adapted to be rotatable along with thumb nut 10 with an O-ring 23 between it and thumb nut 10. A compression spring 24 is arranged between the driver 16 and the seal driver 17 so that the seal driver 17 is always pressed against the seal holder 19. In addition, the driver 16 is integrally provided with a pin 16a protruding from the side surface thereof facing the seal driver 17 so as to engage with an engaging groove 17a formed in the seal driver 17, thereby transmitting the normal and reverse rotation of the shaft 15 to the seal driver 17 through the driver 16 from the thumb nut 10.

The seal holder 19 is mounted over the bearing 20 and provided with a pair of aligned grooves 19a formed radially in the surface thereof facing the die 21, so that two pins 21a protruding from the die 21 engage with the grooves 19a.

The seal holder 19 is provided with an annular recessed portion 19b recessed an amount which is the same as the thickness of the annular sheet 1 of the packing 18, for receiving the packing 18 therein against the surface of portion 19b facing the seal driver 17. Recessed portion 19b has holes 19c for receiving the seal portions 3 of the packing 18 at the appointed intervals in the circumferential direction in the surface facing seal driver 17, and right angled inlet passages a-e opening into the center of inside ends of successive ones of holes 19c. Inlet passages a, b and c are respectively connected with liquid-introducing pipes u, v and w, which are inserted from the circumferential side surface of the seal holder 19, through radially extending holes 19d connecting to inlet passages a, b and c. In addition, the inlet passages d and e are used in the installation of more liquid-introducing pipes. Furthermore, the seal driver 17 is provided with right angled outlet passages f and g opening into the surface thereof facing the seal holder 19 and respectively connected with liquid-exhaust pipes x and y fitted in radially extending holes 17b in the circumferential side surface of seal driver 17.

If the seal driver 17 and the seal holder 19 are assembled with the packing 18 between them, the seal driver 17 is brought into contact with the portions 3a of the seal portions 3 to form a gap l, having a size which is equal to the distance which the portions 3a of the seal portion 3 protrude, between the seal holder 19 and the seal driver 17 (FIG. 3). This gap l fulfills the function of an air inlet port. In short, each of the outlet passages f and g is selectively connected with the inlet passages a, b and c by manually rotating the seal driver 17 through the thumb nut 10 or automatically rotating the seal driver 17 through the motor 11, the shaft 15 and the thumb nut 10 to supply liquids through the inlet passages a, b and c. When the seal driver 17 is located at the positions which do not correspond to the portions 3a of the seal portions 3, the outlet passages f and g communicate with the atmosphere due to the existence of the gap l, to draw air into the outlet passages f and g. Thus, by incremental rotation of the seal driver 17, the liquid and the gas are alternately introduced into the liquid-exhaust pipes x and y.

A luminous element 26 and a light-receiving element 27 are mounted to the casing 22 and a shading plate 25 is held by the shaft 15 between the luminous element 26 and the light-receiving element 27 to transmit predetermined amounts of light from light transmitting element 26 to light-receiving element 27 according to its angular position, thereby to identify the relative positions of the inlet passages a-e with respect to the outlet passages f and g based on the light transmitted to light-receiving element 27.

According to the present invention, a packing is obtained by integrally forming O-rings, which have previously been separately and independently formed one-by-one in the prior art, on one annular sheet, so that O-rings (sealing portions 3 of packing 18) are very easy to install and remove. In addition, since a plurality of O-rings are integrally installed at once, the cost of installation is reduced. Furthermore, additional advantageous affects are obtained in that the inside surface of the seal portions, that is, the inside wall surface of the gas-liquid holes 5, are even by integrally formation, so that the sample liquid can be prevented from clogging the gas-liquid hole. For example, even blood and the like can smoothly flow through the liquid-liquid hole without totally or even partially clogging it.

While the present invention has been illustrated and described with reference to only a single perferred embodiment thereof, it will be recognized by those skilled in the art that numerous changes and modifications may be made without departing spirit and scope of the invention which is limited only by the appended claims.

What is claimed is:

1. A packing, comprising an annular sheet formed of an elastic material, having a center axis and opposite first and second generally planar annular surfaces centered at and extending perpendicularly to said axis, and a plurality of seal portions formed integral with said sheet at circumferentially spaced apart locations about said axis, each of said seal portions extending outwardly from said first surface and having a hole therein extending parallel to said axis entirely through said sheet.

2. A packing as in claim 1, wherein each of said seal portions projects outwardly of said first surface to a free end thereof, each of said seal portions having an annular rib formed thereon at said free end.

* * * * *